United States Patent
Smith et al.

(10) Patent No.: US 7,302,798 B2
(45) Date of Patent: Dec. 4, 2007

(54) HYDRAULIC SYSTEM, RESERVOIR AND PUMP SUCTION ENHANCER FOR MOTOR VEHICLE

(75) Inventors: Steve Carlton Smith, Powell, TN (US); Masami Kimoto, Anjo (JP); Takashi Imanishi, Okazaki (JP); Teruaki Kabeya, Gamagori (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 616 days.

(21) Appl. No.: 10/885,109

(22) Filed: Jul. 7, 2004

(65) Prior Publication Data

US 2006/0008356 A1    Jan. 12, 2006

(51) Int. Cl.
*F04F 5/00* (2006.01)
*F04C 15/00* (2006.01)
*B62D 5/06* (2006.01)

(52) U.S. Cl. ............................. 60/464; 60/468; 60/494
(58) Field of Classification Search ............... 60/422, 60/426, 464, 468, 494
See application file for complete search history.

(56) References Cited

U.S. PATENT DOCUMENTS

| | | | |
|---|---|---|---|
| 2,251,664 A | 8/1941 | Davis | |
| 3,043,107 A | * 7/1962 | Magaus, Jr. | 60/494 |
| 3,370,423 A | 2/1968 | Vaughan | |
| 3,620,646 A | * 11/1971 | Stevenson et al. | 60/468 |
| 3,946,562 A | 3/1976 | Ross | |
| 5,802,848 A | 9/1998 | McClendon et al. | |
| 5,943,861 A | 8/1999 | Davison et al. | |
| 2002/0168269 A1 | 11/2002 | Heath et al. | |
| 2003/0223889 A1 | 12/2003 | Sanderson et al. | |

FOREIGN PATENT DOCUMENTS

EP    1 264 107 B1    12/2002
WO    WO 03/023227 A1    3/2003

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A hydraulic system for a motor vehicle is provided with a pump suction enhancer includes a body section defining a small chamber, a venturi tube passage exposed to the small chamber at an inner end thereof and connected to the suction port of the oil pump, and a nozzle protruding into the small chamber to face the inner end of the venturi tube passage with a space relative to the venturi tube passage in axial alignment with the same. The flow divider divides the operating oil discharged from the oil pump into a return flow to the pump suction enhancer and a supply flow which passes through a power steering device to return to an oil reservoir. The pump suction enhancer may be integrally formed with the oil reservoir or provided as a discrete component separated from the oil reservoir, oil pump and the flow divider.

9 Claims, 7 Drawing Sheets

HYDRAULIC SYSTEM, RESERVOIR AND PUMP SUCTION ENHANCER FOR MOTOR VEHICLE

BACKGROUND OF THE INVENTION

1. Field of the Invention

The present invention relates to a hydraulic system for a motor vehicle incorporating a pump suction enhancer therein for boosting operating oil flow into a suction port of an oil pump, and also relates to an oil reservoir provided bodily with the pump suction enhancer. It further relates to the pump suction enhancer for use in the hydraulic system or in combination with the oil reservoir.

2. Discussion of the Related Art

In a hydraulic system or circuit device for a motor vehicle, the oil flow discharged from a power steering oil pump tends to become larger with increase in number of function components or accessories such as a radiator cooling fan device, suspension control actuators and the like in addition to a power steering device. With the large discharge flow from the oil pump, it has been required to improve the suction of a large return oil flow into the oil pump in order to prevent cavitation from occurring at the suction passage to the oil pump.

In a hydraulic system of this kind, as described in U.S. Pat. No. 5,802,848 to McClendon et al., a power steering pump draws operating oil from a reservoir and supplies a constant volume of the operating oil to a fluid motor for a radiator cooling fan device through a main conduit. At the downstream of the radiator cooling fan device, the main conduit is divided by a flow divider into a low flow conduit leading to the reservoir through a steering assist fluid motor (i.e., power steering device) and a high flow conduit bypassing the steering assist fluid motor to lead to the reservoir. Thus, a large volume of the operating oil is returned to the reservoir after the use for driving the radiator cooling fan device, while a small volume of the operating oil is used for driving the steering assist motor before being returned to the reservoir. Further, means for boosting the suction of the operating oil into a suction port of the power steering pump is incorporated in an internal chamber of the reservoir and is submerged in the operating oil in the chamber. The means for boosting the suction includes a venturi tube passage and a nozzle which are arranged so that the large volume of the operating oil returned from the high flow conduit is ejected from the nozzle into the venturi tube passage thereby to boost the suction of the operating oil to a passage connected to the suction port of the power steering pump.

However, in the known hydraulic system, the means for boosting the suction is incorporated submerged in the reservoir, and the reservoir itself is provided bodily with the power steering pump. Thus, a problem arises in that substantial restraint is imposed on the place where the pump and reservoir combination is arranged. That is, the place where the pump and reservoir combination can be arranged is determined in dependence on the arrangement in an engine room of mechanical units and components such as an engine, a power steering device, a brake booster device, a battery, a radiator, etc. In some cases, the pump and reservoir combination may be arranged close to the power steering device but may be too far from the radiator cooling fan device to use a conduit of an adequate length which is designed against vibration, pulsation and other adverse causes. In this case, an oil pump and an oil reservoir may not be used in integration and may rather be arranged at respective places separated from, and independently of, each other. This problem becomes more serious in the case that the number of accessories such as radiator cooling fan device, suspension control actuators and the like increases.

Another known hydraulic system of this kind is described in U.S. Pat. No. 5,943,861 to Davison et al., wherein an oil reservoir is provided separated from a power steering pump and wherein means for boosting the suction of the operating oil into a suction port of the power steering pump is incorporated in the reservoir to extend across an internal chamber of the same. The means for boosting the suction is composed of a venturi tube passage and a nozzle which are arranged in the internal chamber of the reservoir to extend diametrically of the same in alignment. Therefore, the venturi tube passage and the nozzle have to be assembled inside of the reservoir. This disadvantageously makes the assembling work for the oil reservoir complicated and troublesome and also makes the maintenance or check of the boosting means substantially impossible.

SUMMARY OF THE INVENTION

Accordingly, it is a primary object of the present invention to provide an improved hydraulic system for a motor vehicle wherein means for boosting pump suction does not impose any substantial restraint on the place where an oil pump is arranged.

Another object of the present invention is to provide an improved oil reservoir with a pump suction enhancer for use in a hydraulic system for a motor vehicle.

A further object of the present invention is to provide an improved pump suction enhancer which is capable of boosting the suction of a large return flow into an oil pump and which does not impose any substantial restraint on the places where the oil pump and an oil reservoir therefor are arranged.

Briefly, in one aspect of the present invention, there is provided a hydraulic system for a motor vehicle, which comprises an oil pump driven by a prime mover for discharging operating oil from a discharge port thereof, function component means hydraulically operated by permitting the operating oil discharged form the oil pump to pass therethrough, and flow divider means provided between the oil pump and the function component means for dividing the operating oil discharged from the oil pump into a part thereof directed toward the function component means and the remaining part thereof. The hydraulic system further comprises an oil reservoir provided independently of the oil pump and fluidly connected to the function component means through conduit means for receiving the operating oil returned from the function component means and a pump suction enhancer provided bodily with the oil reservoir outside the same for boosting the suction of the operating oil into the oil pump. The pump suction enhancer includes a body section provided on an external portion of the oil reservoir for defining a side chamber opening to a reservoir chamber defined in the oil reservoir, a venturi tube passage exposed at one end thereof to the side chamber and fluidly connected to the suction port of the oil pump through a second conduit for enabling the operating oil to be drawn into a suction port of the oil pump, and a nozzle fluidly connected to the flow divider means for receiving the remaining part of the operating fluid returned from the flow divider means and protruding into the side chamber to face an inner end of the venturi tube passage with a space relative to the venturi tube passage for ejecting a jet stream of the operating oil into the venturi tube passage thereby to draw and plunge the operating oil from the side chamber into the venturi tube passage.

With this construction, the pump suction enhancer is provided bodily with the oil reservoir which is separated from the oil pump. Thus, the pump suction enhancer can be arranged together with the oil reservoir at a desired place which is different from the place where the oil pump is arranged. Thus, the location of the pump suction enhancer in an engine room of the motor vehicle can get rid of being restrained to the location of the oil pump in the engine room, so that freedom can be gained in designing the arrangement of hydraulic components such as the oil pump, the oil reservoir, the function components and the like in the engine room. Further, since the pump suction enhancer is provided outside, or on an external surface, of the oil reservoir, it can be easily assembled with the oil reservoir, so that the assembling work for the oil reservoir can be simplified. In addition, the maintenance or check of the boosting means becomes easier to carry out from the outside of the oil reservoir.

In another aspect of the present invention, an oil reservoir incorporated in a hydraulic system for a motor vehicle is provided, wherein flow divider means is provided for dividing operating oil discharged from an oil pump into a first stream directed toward function component means which is hydraulically operated by permitting the operating oil discharged form the oil pump to pass therethrough, and into a second stream. The oil reservoir comprises a reservoir body defining therein a reservoir chamber for containing the operating oil to be supplied to a suction port of the oil pump and provided with return port means for leading the operating oil returned from the function component means to the reservoir chamber and a pump suction enhancer provided bodily with the oil reservoir outside the same for boosting the suction of the operating oil into the oil pump. The pump suction enhancer includes a body section provided on an external portion of the reservoir body for defining a side chamber opening to the reservoir chamber defined in the reservoir body, a venturi tube passage exposed at an inner end thereof to the side chamber and fluidly connected to the suction port of the oil pump through a conduit for supplying the operating oil to the oil pump, and a nozzle fluidly connected to the flow divider means for receiving the remaining part of the operating fluid returned from the flow divider means and protruding into the side chamber to face the inner end of the venturi tube passage with a space relative to the venturi tube passage for ejecting a jet stream of the operating oil into the venturi tube passage to plunge the operating oil from the side chamber into the venturi tube passage.

With this construction, the pump suction enhancer is provided bodily with the oil reservoir which is separated from the oil pump, on an external portion of the reservoir body. Thus, the same advantages and effects as attained by the aforementioned hydraulic system can also attained by the oil reservoir according to the present invention in this aspect.

In a further aspect of the present invention, there is provided a pump suction enhancer for use in a hydraulic system for a motor vehicle, wherein flow divider means divides operating oil discharged from an oil pump into a first stream to pass through function component means hydraulically operated by the operating oil therethrough and a second stream to be returned to the pump suction enhancer. The pump suction enhancer is provided independently of, and separated from, the oil pump and the oil reservoir and comprises a body section formed with a chamber connectable to receive the operating oil from the oil reservoir. The pump suction enhancer further comprises a venturi tube passage formed in the body section to open to the chamber at an inner end thereof and connectable to charge the operating oil into a suction port of the oil pump and a nozzle formed in the body section in axial alignment with the venturi tube passage and protruding into the chamber to face the inner end of the venturi tube passage with a space relative thereto for ejecting the operating oil, returned from the flow divider means, as a jet stream into the venturi tube passage to plunge the operating oil from the chamber into the venturi tube passage.

With this construction, the pump suction enhancer is constituted as a discrete component separated from the oil pump, the oil reservoir and other function components hydraulically operated by the operating oil discharged from the oil pump. Therefore, it can be realized to arrange the pump suction enhancer at any desirable place which is suitable for connections with other components, so that the pump suction enhancer does not impose any substantial restraint on the arrangement of the oil pump, the oil reservoir and other function components hydraulically operated by the operating oil discharged from the oil pump. In addition, by the appropriate arrangement of the oil pump, the oil reservoir and those function components in the engine room, conduits for fluidly connecting the components may be made as those having adequate lengths, so that the performance of the hydraulic system can also be improved.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

A hydraulic system for a motor vehicle in a first embodiment according to the present invention will be described hereinafter with reference to FIGS. 1 through 4. The hydraulic system comprises an oil reservoir 10 and an oil pump 22 which constitute an operating oil supply and further comprises a radiator cooling fan device 23, a power steering device 24, and a suspension control mechanism 25 which constitute hydraulically operated function accessories or components for a motor vehicle (not shown).

Figure 1:
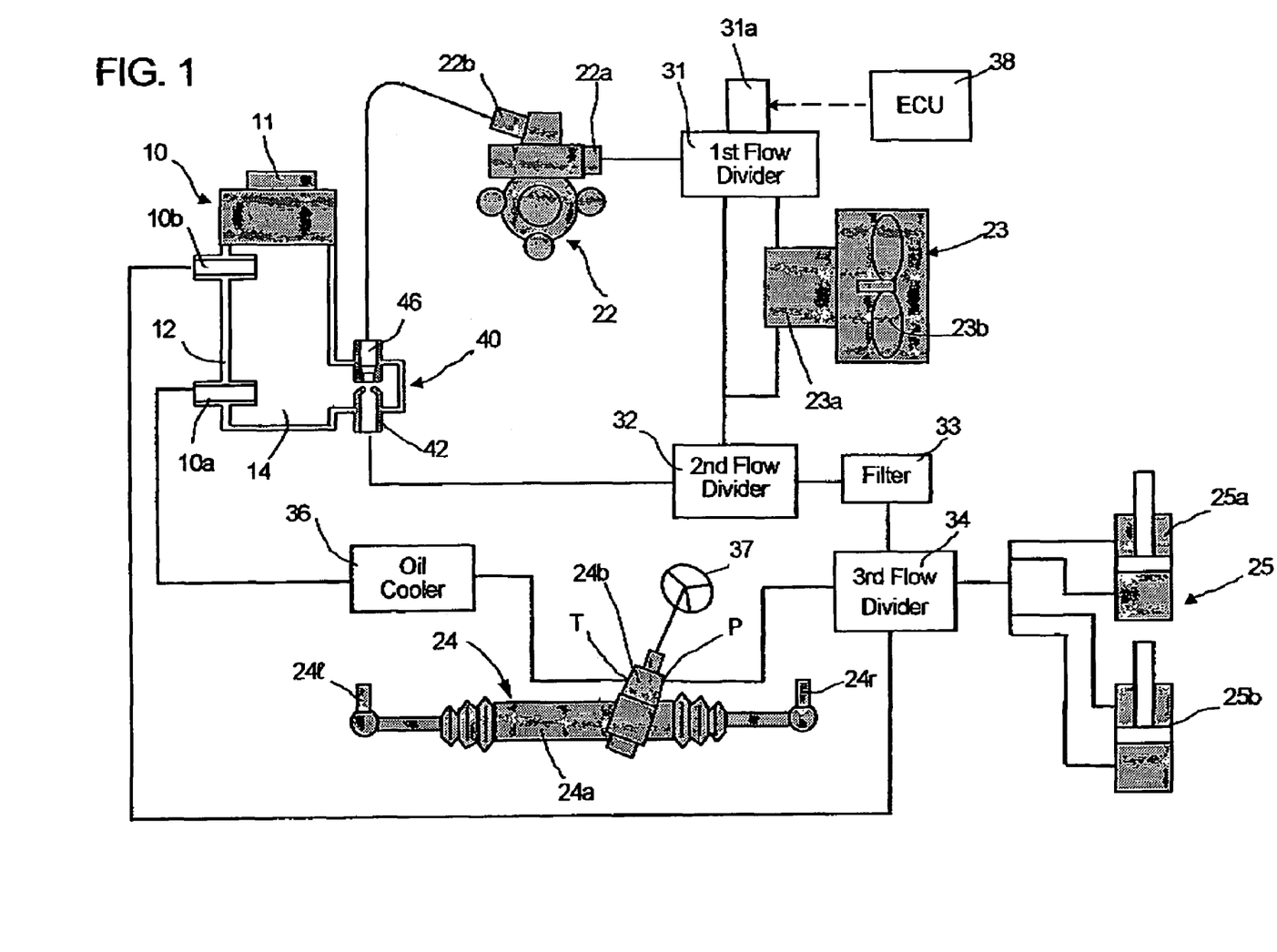
FIG. 1 is a circuit diagram showing a hydraulic system for a motor vehicle in a first embodiment according to the present invention.

The oil pump 22 constituted by, e.g., a vane pump, which is connected to be driven by a crankshaft of a combustion engine (both not shown) of the motor vehicle. The oil pump 22 incorporates a flow control mechanism and a relief valve mechanism (both not shown) therein. The relief valve mechanism operates in an abnormal state to protect the oil pump 22 from damage. The flow control mechanism controls the flow volume discharged from a discharge port 22a to increase in proportion to an increase in the rotational speed of the crankshaft or a pump rotor (not shown) until the rotational speed reaches a predetermined rotational speed and maintains the discharge flow volume substantially constant (i.e., a predetermined maximum flow volume Qmax) irrespective of a further increase in the rotation speed after the same reaches the predetermined rotational speed. The predetermined maximum flow volume Qmax discharged from the discharged port 22a is designed to be equal to or somewhat larger than the sum of the maximum flow volumes (i.e., first to third predetermined maximum flow volumes Q1-Q3) which the radiator cooling fan device 23, the power steering device 24, and the suspension mechanism 25 respectively demand when exercising their full capabilities or performances.

The operating oil discharged from the discharge port 22a is supplied to a first flow divider 31, which is controllable by an electromagnetic control valve 31a incorporated therein, That is, the electromagnetic control valve 31a is operated in response to a command signal from an ECU (Electronic Control Unit) 38 of the motor vehicle and controls the ratio between the flow volume of the operating oil directed to the radiator cooling fan device 23 and the flow volume of the operating oil directed to a second flow divider 32. Thus, a part of the operating oil passes through a cooling fan drive motor 23a, so that the operation of the cooling fan device 23, i.e., the rotational motion and speed of the cooling fan device 23 can be controlled by the ECU 38. The cooling fan drive device 23 is of a known type, wherein a cooling fan 23b can be rotated by the cooling fan drive motor 23a constituted by a hydraulic motor such as, e.g., a vane type motor. The first flow divider 31 is constituted by, for example, a conventional flow control mechanism of the same construction as that incorporated in the oil pump 22. However, the first flow divider 31 is different from the flow control mechanism incorporated in the oil pump 22 in that it can be controllable by the electromagnetic control valve 31a so that the ratio between the flow volumes branched toward the radiator cooling fan device 23 and the second flow divider 32 can be adjusted as instructed by the command signal from the ECU 38.

The operating oil directly supplied from the first flow divider 31 and the operating oil discharged from the fan drive motor 23a are joined and supplied to the second flow divider 32. The second flow divider 32 directs the operating oil as a supply flow or stream through a filter 33 to a third flow divider 34 until the flow volume toward the same reaches the sum of the second and third predetermined maximum flow volumes Q2, Q3 which the power steering device 24 and the suspension mechanism 25 respectively demand when exercising their full performances or capabilities. When having a larger flow volume than the sum of the second and third predetermined maximum flow volumes Q2, Q3 flown thereinto, the second flow divider 32 directs toward a pump suction enhancer 40 as referred to later in detail the superfluous or surplus flow volume which is the remaining part of such a large flow volume after directing the sum of the second and third predetermined maximum flow volumes Q2, Q3 toward the third flow divider 34. That is, the second flow divider 32 directs the operating oil exclusively toward the third flow divider 34 until the flow volume directed toward the third flow divider 34 reaches the sum of the second and third predetermined maximum flow volumes Q2, Q3, but directs the surplus flow volume beyond the sum toward the pump suction enhancer 40. The second flow divider 32 is constituted by, for example, a conventional flow control mechanism (not shown) of the same construction as that incorporated in the oil pump 22. The second flow divider 32 also incorporates therein a relief valve mechanism (not shown) so that the passages which connect the second flow divider 32 to the power steering gear 24 and the suspension mechanism 25 through the filter 33 and the third flow divider 34 can be prevented from increasing in pressure beyond a predetermined relief pressure.

The third flow divider 34 divides the operating oil discharged from the second flow divider 32 into two streams for use by the power steering device 24 and the suspension mechanism 25. More specifically, the third flow divider 34 directs the operating oil exclusively toward the power steering device 24 until the flow volume toward the same reaches the second predetermined maximum flow volume Q2 which the power steering device 24 demands when exercising the full performance or capability thereof. When having a larger flow volume than the second predetermined maximum flow volume Q2 flown thereinto, the third flow divider 34 directs for use by the suspension mechanism 25 the superfluous or surplus flow volume which is the remaining part of such a large flow volume after directing the second predetermined maximum flow volume Q2 toward the power steering device 24.

That is, the third flow divider 34 directs the operating oil exclusively toward the power steering device 24 until the flow volume directed toward the same reaches the second predetermined maximum flow volume Q2, but directs the surplus flow volume which exceeds the second predetermined maximum flow volume Q2, for use by the suspension mechanism 25. Thus, the third flow divider 34 is constituted by, for example, a conventional flow control mechanism and an orifice (both not shown) which is connected in series with a drain port of the flow control mechanism. More specifically, the flow control mechanism incorporated in the third flow divider 34 directs the operating oil supplied thereto exclusively toward the power steering device 24 until the flow volume toward the same reaches the second predetermined maximum flow volume Q2 and discharges the surplus flow volume over the same Q2 from the drain port toward the orifice. A passage branches from between the drain port of the flow control mechanism and the orifice at the downstream thereof and is connected to hydraulic cylinders 25a, 25b of the suspension mechanism 25 so that a controlled pressure is applied to the hydraulic cylinders 25a, 25b. The downstream of the orifice is connected to a second return port 10b of the oil reservoir 10 for returning the operating oil from the third flow divider 34 to the oil reservoir 10.

The power steering device 24 is a known type, which is composed of a power cylinder 24a and a center-open servo valve 24b. The power cylinder. 24a has a pair of cylinder chambers partitioned by a movable piston (not shown)

which is connected to right and left front wheels (not shown) of the vehicle through a pair of right and left link mechanisms 24r, 24l. The servo valve 24b is connected to be operated by a steering handle 37. When the steering handle 37 is at the neutral position, the servo valve 24b is at the center position and directs the operating oil flown from an inlet port P, to an outlet port T therethrough without developing substantial resistance or impedance. As is well-known in the art, when the steering handle 37 is turned in either one direction, the servo valve 24b controls the supply of the operating oil to one of the cylinder chambers and simultaneously controls the discharge of the operating oil from the other cylinder chamber in dependence on the turning angle of the steering handle 37, so that the operation of the power cylinder 24a and hence, the orientation of the front wheels can be controlled to follow the turning motion of the steering handle 27. The operating oil discharged from the outlet port T of the servo valve 24b is returned to a first return port 10a of the oil reservoir 10 through an oil cooler 36. The oil cooler 36 is constituted by a conventional heat exchanger of a self-cooling type or a compulsory cooling type.

Figure 2:
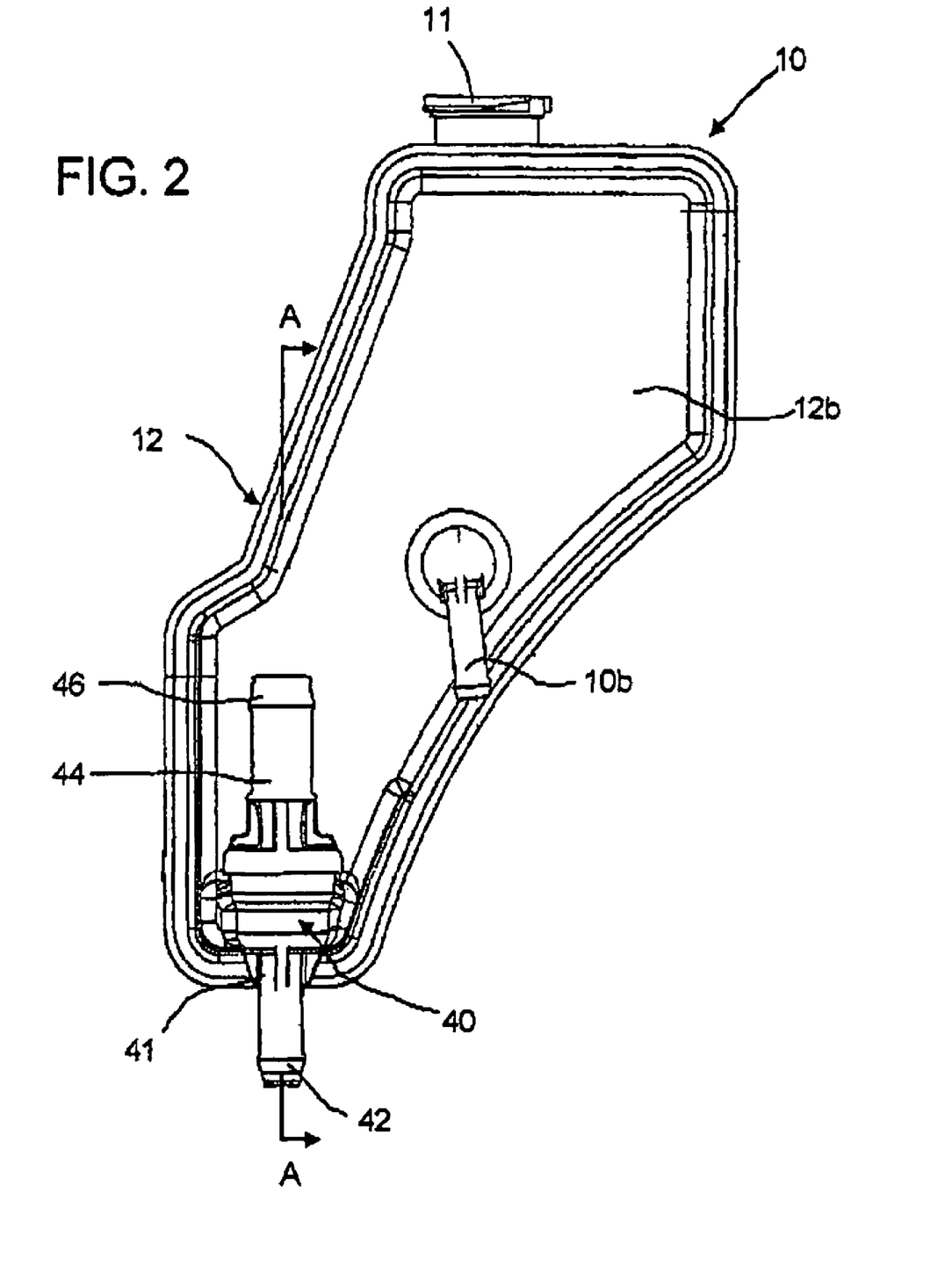
FIG. 2 is an elevational view of an oil reservoir incorporated in the hydraulic system.

The oil reservoir 10 includes a body section 12 and a top cap11. The pump suction enhancer 40 is provided bodily on the body section 12 for boosting the suction of operating oil into a suction port 22b of the oil pump 22. The pump suction enhancer 40 is connected at an inlet port 42 to the second flow divider 32 to be charged with the superfluous oil flow returned toward the oil reservoir 10 and is also connected at an outlet port 46 to the suction port 22b of the oil pump 22.

Figure 3:
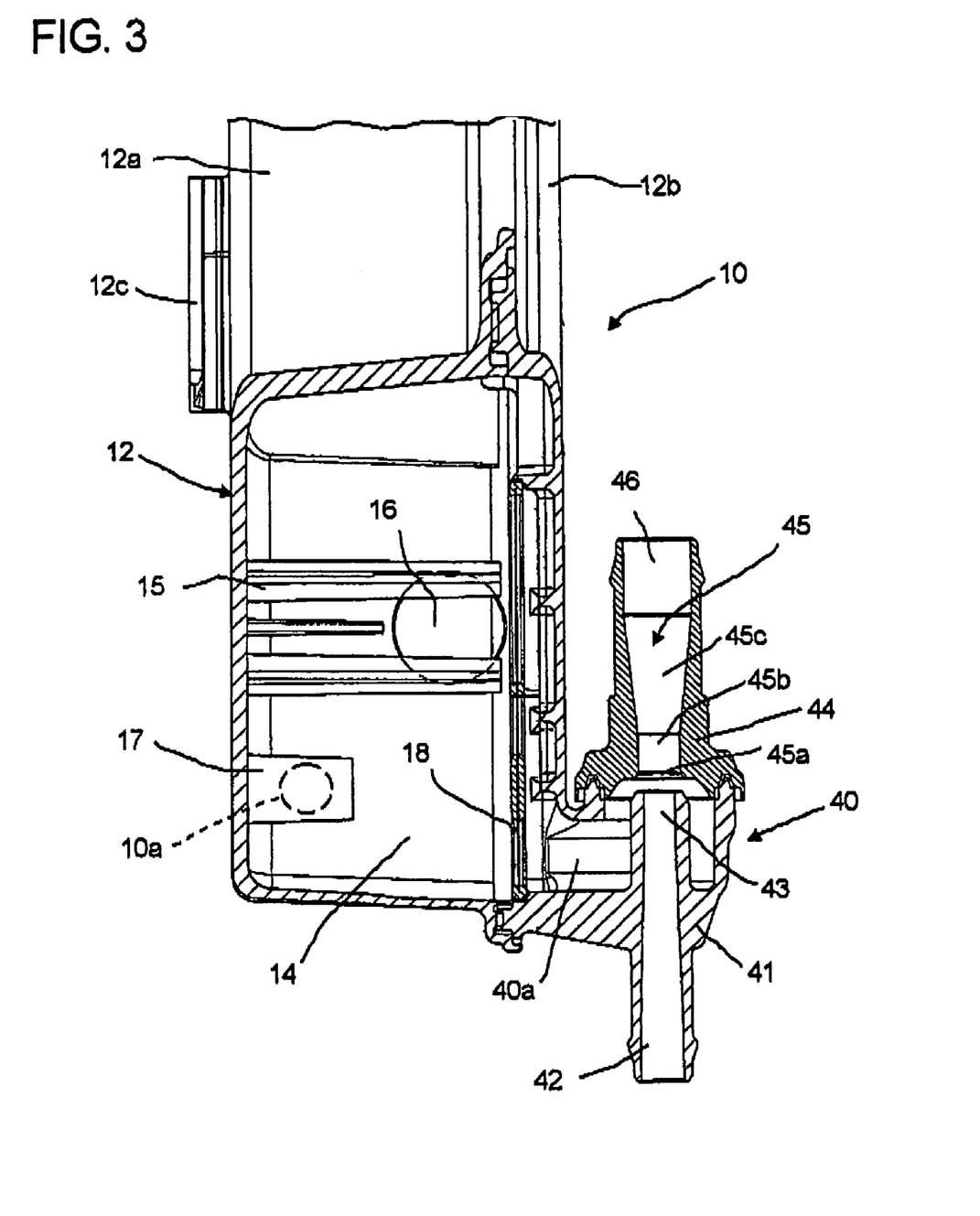
FIG. 3 is an enlarged, fragmentary sectional view of the oil reservoir taken along the line A-A in FIG. 2.
Figure 4:
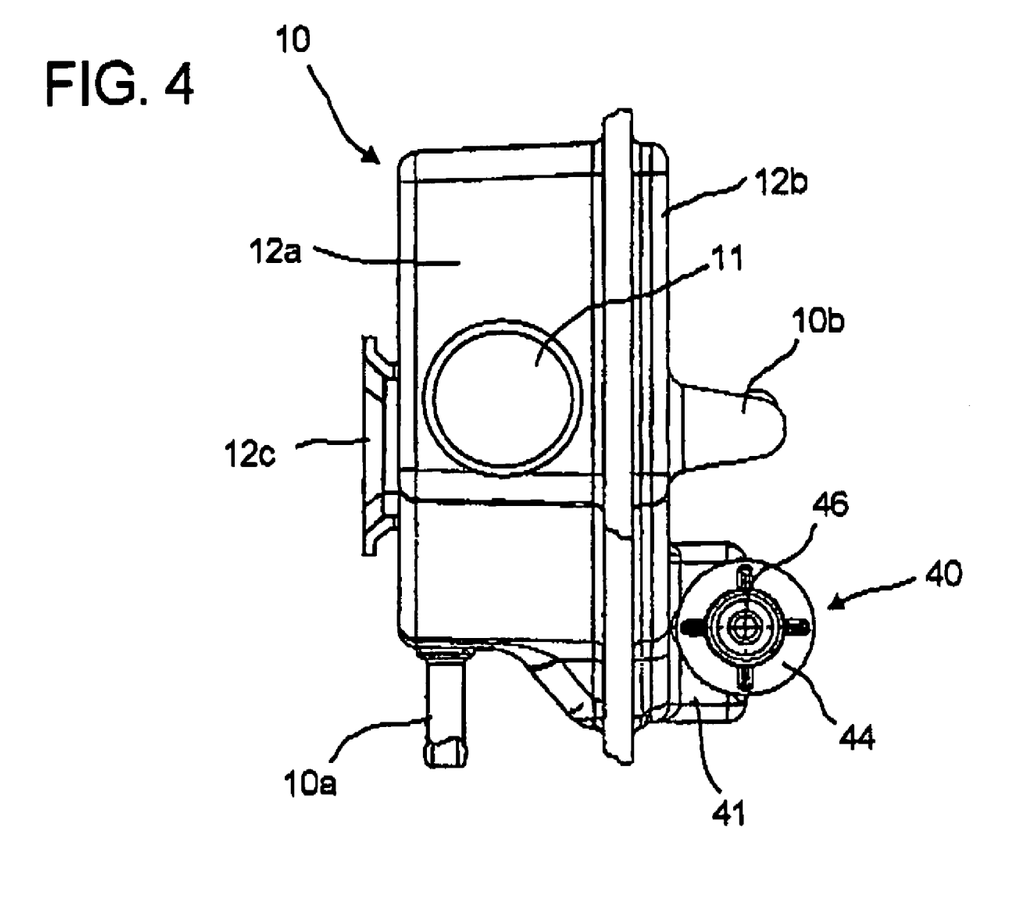
FIG. 4 is a top view of the oil reservoir.

Specifically, as shown in FIGS. 2 through 4, the body section 12 is composed of first and second members 12a, 12b which are made of a resin and which are fabricated by Injection Molding. The first member 12a with a mounting hook 12c takes a vertically elongated, generally box-like shape, while the second member 12b takes a vertically elongated, generally plate-like shape closing the lateral opening of the first member 12a. These members 12a, 12b are joined along a vertical plane to close the lateral opening, so that a reservoir chamber 14 is defined inside the body section 12. The first return port 10a for returning the operating oil from the power steering device 24 opens into a lower part of the reservoir chamber 14, and the second return port 10b for returning the operating oil from the third flow divider 34 opens into a middle part of the reservoir chamber 14. In the lower part of the reservoir chamber 14, there is provided a magnet holder 15, by which a permanent magnet piece 16 is held for magnetically attracting iron powder flowing in the operating oil. Also in the lower part of the reservoir chamber 14, there is provided a deflector 17 in position to face the first return port 10a, so that the operating oil returned into the reservoir chamber 14 from the power steering device 24 is deflected toward the boundary between the body section 12 and the pump suction enhancer 40.

As best shown in FIG. 3, the pump suction enhancer 40 is integrally provided at the lower part of the second member 12b of the pump body section 12. The pump suction enhancer 40 defines a side chamber 40a therein, which opens to the reservoir chamber 14. A mesh filter element 18 is arranged at the boundary between the reservoir chamber 14 and the side chamber 40a. The deflector 17 directs the return oil flow toward the mesh filter element 18, so that the operating oil returned from the power steering device 24 is caused by the deflector 17 to flow into the side chamber 40a.

Specifically, the pump suction enhancer 40 is composed of an inlet section 41 and an outlet section 44 which is seated on, and bodily joined with, a top round edge portion of the inlet section 41 for defining the side chamber 40a. The inlet section 41 integrally protrudes the inlet port 42 downward and also integrally protrudes a nozzle 43 upward inside the side chamber 40a. The inlet port 42 and the nozzle 43 are connected to constitute a single tapered hole decreasing in diameter toward the nozzle 43. The tapered hole ensures that the return oil flows from the inlet port 42 to the nozzle 43 smoothly not to make any turbulent flow. The outlet section 44 is spaced at its inner end from the upper end of the nozzle 43 and is formed with a venturi tube passage 45 which includes a chamfer portion 45a, a throat portion 45b, a diffusion portion 45c and an outlet port 46 in turn from the inner end toward the upper end thereof in axial alignment with the nozzle 43. Thus, when the operating oil from the second flow divider 32 is ejected from the nozzle 43 into the venturi tube passage 45, the operating oil inside the side chamber 40a is drawn and plunged into the venturi tube passage 45 by way of the space between the nozzle 43 and the inner end of the venturi tube passage 45.

The operation of the hydraulic system as constructed above will be described hereafter. First of all, let it be assumed that during the full performance operations, the radiator cooling fan device 23, the power steering device 24 and the suspension mechanism 25 demand their maximum flow volumes Q1-Q3 of, e.g., 37 liters per minute, 10 liters per minute and 5 liters per minute, respectively, and that the oil pump 22 discharges the flow volume as high as 52 liters per minute or somewhat larger than the same in its full performance operation. However, it is to be noted the flow volume discharged from the oil pump 22 depends on the pump rotor (i.e., engine) rotational speed and ranges from 8 liters per minute to 52 liters per minute as the engine rotational speed increases from 800 rpm (idling) to 4,000 rpm.

Assuming now that the engine is rotating at 4,000 rpm, the oil pump discharges 52 liters per minute to the first flow divider 31. In dependence upon the command signal from the ECU 38, the electromagnetic control valve 31a is operated to make a part of the discharged operating oil pass through the cooling fan drive motor 23a and the remaining part thereof go directly to the second flow divider 32. The ratio between these streams of the operating oil is controlled by the electromagnetic control. valve 31a which operates in response to the command signal from the ECU 38. Thus, the radiator cooling fan device 23 is operated under the control of the ECU 38 to maintain the radiator temperature less than a predetermined value, for example, The second flow divider 32 directs the operating oil flown thereinto exclusively toward the third flow divider 34 until the flow volume toward the same reaches the sum of the second and third predetermined maximum flow volumes Q2, Q3 (i.e., 10 liters per minute and 5 liters per minute) which are respectively demanded by the power steering device 24 and the suspension mechanism 25 during their full performance operations. The second flow divider 32 can return the superfluous flow volume exceeding the sum (i.e., 15 liters per minute), to the inlet port 42 of the pump suction enhancer 40 provided integrally with the oil reservoir 10.

The operating oil discharged from the second flow divider 32 is supplied through the filter 33 to the third flow divider 34. The third flow divider 34 takes a priority over directing the operating oil toward the power steering device 24 rather than directing it toward the suspension mechanism 25. Thus, the third flow divider 34 operates to direct the operating oil exclusively toward the power steering device 24 until the flow volume to the same reaches the predetermined maximum flow volume Q2 (i.e., 10 liters per minute) demanded by the power steering device 24, and thereafter, to direct the superfluous flow volume exceeding the maximum flow volume Q2, for use in pressure control of the suspension mechanism 25. The operating oil supplied to the power steering device 24 and discharged therefrom is returned through the oil cooler 36 to the first return port 10a of the oil reservoir 10 and is further returned into the reservoir chamber 14. The operating oil returned inside the reservoir chamber 14 is deflected by the deflector 17 toward the side chamber 40a of the pump suction enhancer 40.

On the other hand, the operating oil directed by the third flow divider 34 toward the suspension mechanism 25 is throttled by the orifice provided at the downstream of the flow control mechanism also incorporated therein, so that a pressure is generated between the drain port of the flow control mechanism and the orifice to operate the cylinder devices 25a, 25b of the suspension mechanism 25. The operating oil past the orifice is returned to the reservoir chamber 14 through the second return port 10b.

Accordingly, when the oil pump discharges its maximum flow volume Qmax (e.g., 72 liters per minute) at 4,000 rpm of the engine speed, the first maximum flow volume Q1 (e.g., 37 liters per minute) demanded by the radiator cooling fan device 23 is returned from the second flow divider 32 to the pump suction enhancer 40 and is ejected from the nozzle 43 to make a jet stream boosted into the venturi tube passage 45. The flow of the operating oil ejected from the nozzle 43 into the venturi tube passage 45 acts to draw the operating oil in the side chamber 40a. Since the operating oil ejected from the nozzle 43 into the venturi tube passage 45 is sufficiently larger in flow volume than that drawn from the side chamber 40a into the venturi tube passage 45, the operating oil to be replenished from the side chamber 40a into the venturi tube passage 45 is carried by the jet stream and is boosted to be plunged into the venturi tube passage 45. That is, the jet stream ejected from the nozzle 43 draws and plunges the operating oil from the side chamber 40a into the venturi tube passage 45. The velocity energy of the jet steam is converted into the pressure energy as it passes through the venturi tube passage 45, and the pressure of the operating oil charged into to the suction port 22b of the oil pump 22 is increased. Consequently, the pump suction efficiency can be improved, and the cavitation which would otherwise be caused by the insufficient charge of the operating oil into the suction port 22b of the oil pump 22 can be suppressed or prevented from being generated.

In the foregoing first embodiment, the pump suction enhancer 40 is constituted to be integral with the oil reservoir 10, but separated from the oil pump 22. Therefore, the freedom in choosing the places where to mount the oil reservoir 10 and the oil pump 22 can be heightened. That is, in designing the arrangement of function components in an engine room of a motor vehicle, it has been often required that an oil pump and an oil reservoir as an oil supply be located at different places. Further, it is a recent trend that the number of hydraulically operated function accessories or components like the power steering device 24, the radiator cooling fan drive 23, the suspension mechanism 25 and so on increases for easier maneuver as well as for more comfortable and luxurious feeling. These requirements can be satisfied by the hydraulic system in the first embodiment, wherein the oil reservoir 10 can be located at a desirable place which is suitable for connections not only with the oil pump 22 but also with other hydraulically operated function components like the power steering device 24, the radiator cooling fan device 23 and the suspension mechanism 25. Thus, in the hydraulic system or circuit device in the first embodiment, the pump suction enhance 40 hardly imposes any substantial restraint on the arrangement of the hydraulically operated function components in the engine room. In addition, by the appropriate arrangement of those function components in the engine room, the conduits for fluidly connecting the components may be made as those having adequate lengths, so that the performance of the hydraulic system can also be improved.

Although the pump suction enhancer 40 is provided integrally with the oil reservoir 10, it may be fabricated as a discrete component and may be attached by suitable fixing means such as bolts, rivets or the like onto the oil reservoir 10. Further, the pump suction enhancer 40 is provided on a lateral surface of the pump body section 12, it may be provided on another lateral surface or a bottom surface of the pump body section 12. Moreover, although the pump suction enhancer 40 is provided with the nozzle 43 and the venturi tube passage 45 extending vertically in axial alignment, the nozzle 43 and the venturi tube passage 45 may be provided to extend horizontally or on an oblique line.

Second Embodiment

Figure 5:
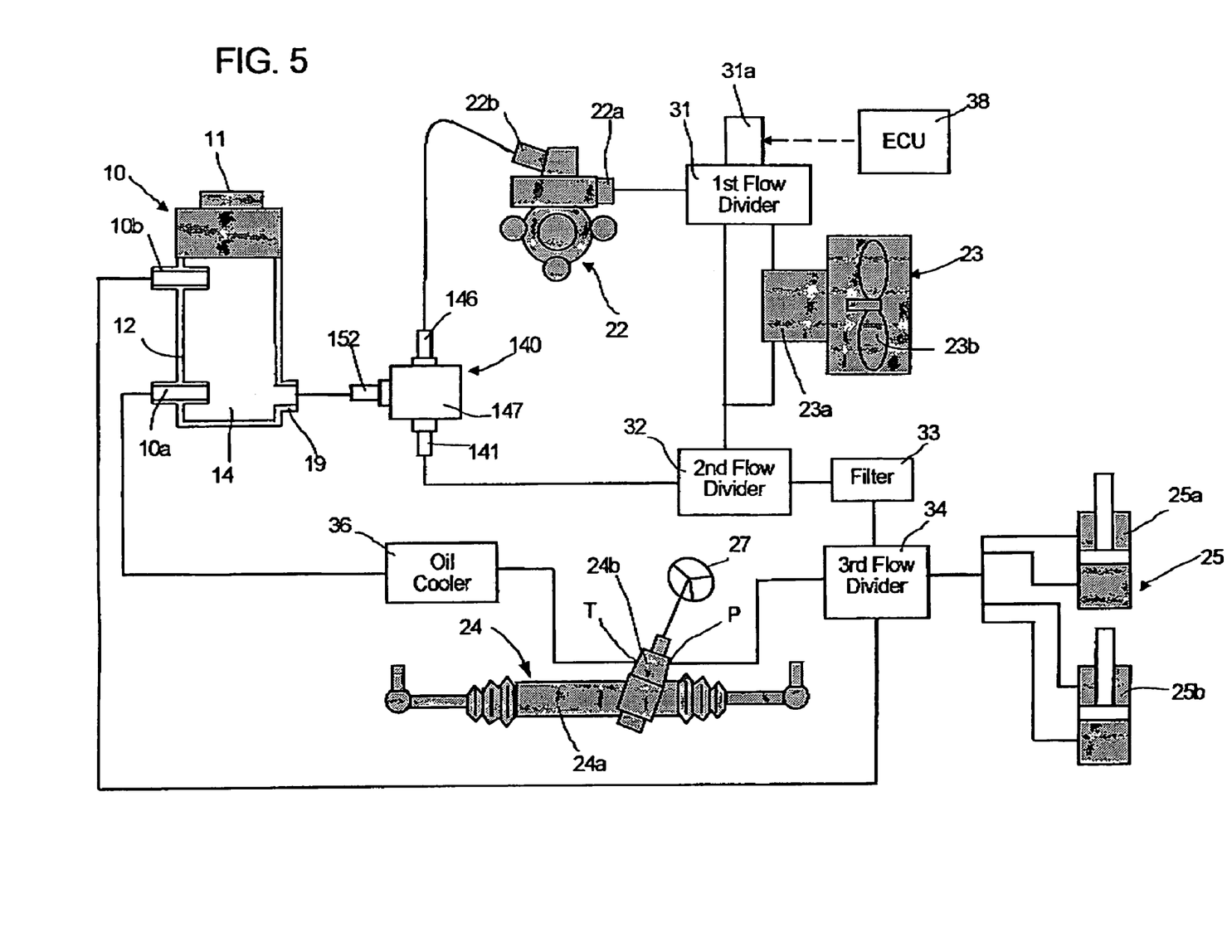
FIG. 5 is another circuit diagram showing a hydraulic system for a motor vehicle in a second embodiment according to the present invention.
Figure 6:
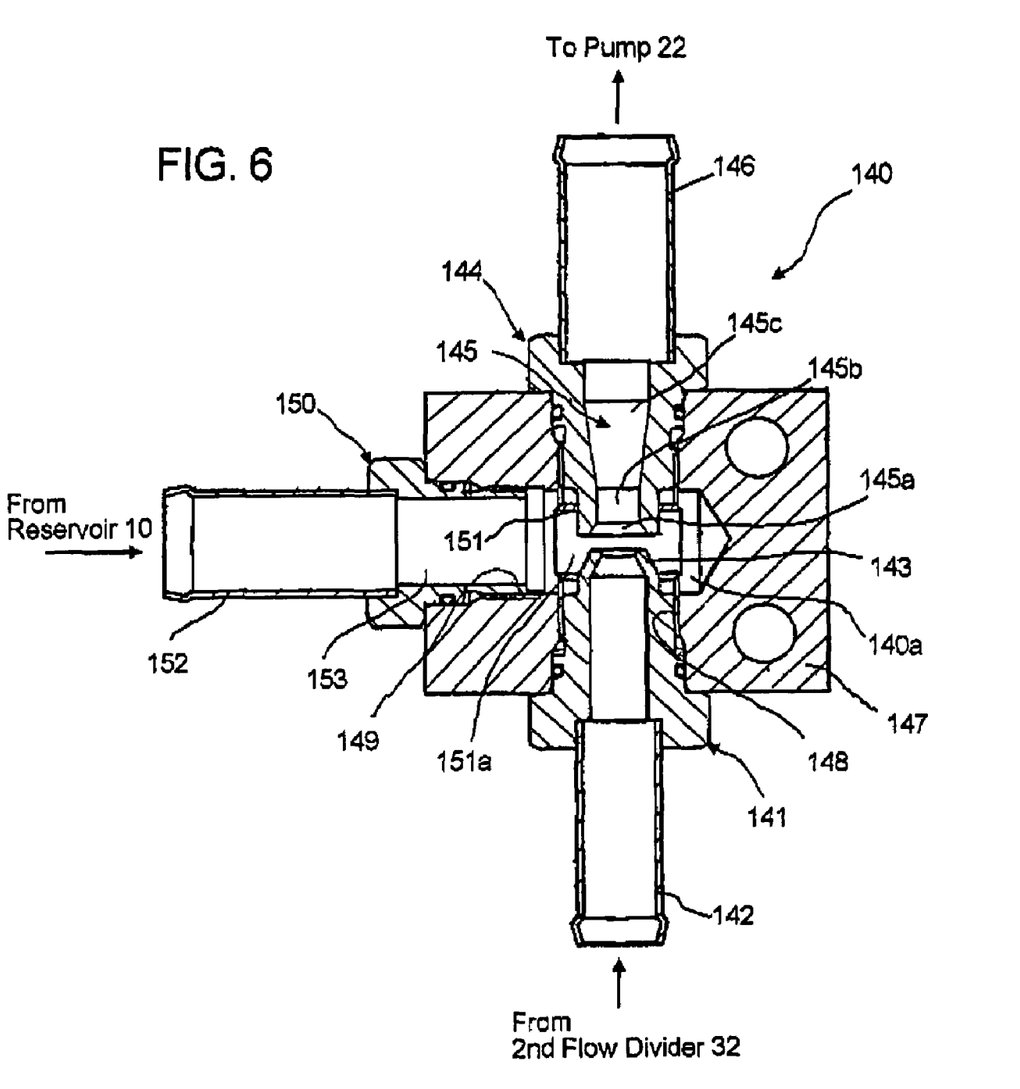
FIG. 6 is a sectional view of a pump suction enhancer incorporated in the hydraulic system in the second embodiment.

Next, a hydraulic system or circuit device in a second embodiment according to the present invention will be described with reference to FIGS. 5 and 6. Referring now to FIG. 5, a pump suction enhancer 140 is illustrated as being a discrete component separated from the oil reservoir 10. Thus, the oil reservoir 10 is provided with a suction outlet port 19 to open to the lower part of the reservoir chamber 14. As shown in FIG. 6, the pump suction enhancer 140 in the second embodiment includes a body member 147 of a generally block-like shape, which is formed with a through hole 148 and a blind hole 149. The blind hole 149 intersects with the through hole 148 to define an intersection chamber 140a. An inlet section 141 and an outlet section 144 are fixedly screwed respectively into opposite open end portions of the through hole 148, and a reservoir port section 150 is fixedly screwed into an open end portion of the blind hole 149.

The inlet section 141 is provided with an inlet port 142 outside and a nozzle 143 inside, while the outlet section 144 is provided with an outlet port 146 outside and a Venturi tube passage 145 inside. The venturi tube passage 145 includes a chamfer portion 145a, a throat portion 145b and a diffusion portion 145c which are arranged connected in turn from the inner end toward the outer end thereof. The inner ends of the inlet and outlet sections 141, 144 are inserted into a cross hole which is formed in a tubular member 151 to pass through lateral sides thereof. The reservoir port section 150 is provided with a reservoir connection port 152 outside and a passage 153 inside to open to the through hole 151a of the tubular member 151. The tubular member 151 is supported inside the intersection chamber 140a in axial alignment with the reservoir port section 150.

In operation, the operating oil returned from the second flow divider 32 is flown into the inlet port 142 and is ejected from the nozzle 143 to make a jet stream toward the venturi tube passage 145. The operating oil in the oil reservoir 10 flows into the reservoir connection port 152 and reaches the intersection chamber 140a and the inside of the tubular member 151 through the passage 153. Thus, the jet stream ejected from the nozzle 143 draws and plunges the operating oil from the tubular member 151 and the intersection chamber 140a into the venturi tube passage 145. The velocity energy of the jet steam is converted into the pressure energy as the jet stream passes through the venturi tube passage 145, and the pressure of the operating oil charged into the suction port 22b of the oil pump 22 is increased. Consequently, the pump suction efficiency can be improved, and the cavitation which would otherwise be caused by the insufficient pressure in the operating oil charged into the suction port 22b of the oil pump 22 can be suppressed or prevented from being generated.

In the foregoing second embodiment, the pump suction enhancer 140 is constituted as a discrete component which is separated from other components in the hydraulic system such as the oil pump 22, the oil reservoir 10, the power steering device 24, the radiator cooling fan device 23 and the suspension mechanism 25 which suffer substantial restraint on the places where they are arranged in the engine room. Therefore, it can be realized to arrange the pump suction enhancer 140 at any desirable place which is suitable for connections with other components, so that the pump suction enhancer 140 does not impose any substantial restraint on the arrangement of the oil pump 22, the reservoir 10, the power steering device 24, the radiator cooling fan device 23 and the like. In addition, by the appropriate arrangement of those components in the engine room, the conduits for fluidly connecting the components may be made as those having adequate lengths, so that the performance of the hydraulic system can also be improved.

In the foregoing first and second embodiments, the components such as the oil reservoir 10, the oil pump 22, the power steering device 24, the radiator cooling fan drive 23, the suspension mechanism 25 and the like are fluidly connected to one another through conduits which are indicated by solid lines in FIGS. 1 and 5. Some or all of these conduits used in the embodiments may be flexible hoses like rubber hoses or may be metallic pipes or may be hybrid conduits each constituted by a center metallic pipe and a pair of flexible hoses connected to the opposite ends of the metallic pipe.

Further, a prime mover for rotationally driving the oil pump 22 is not only constituted by the engine as in the foregoing embodiments, but may also be constituted by other means such as, for example, an electric motor. Where the electric motor is used, the flow control mechanism incorporated in the oil pump 22 may be omitted, instead of which a control function may be added for controlling the rotational speed of the oil pump 22 thereby to control the discharge volume therefrom. Further, pumps of various kinds such as piston pump, gear pump, plunger pump and so on can be used as the oil pump 22 in substitution for the vane pump which is exemplified as a preferred form of such oil pump in the foregoing embodiments.

Third Embodiment

Figure 7:
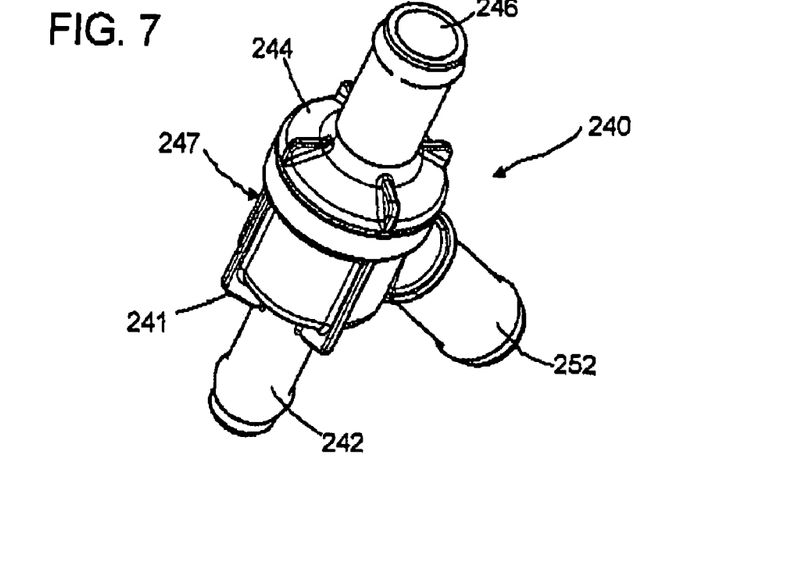
FIG. 7 is a perspective view of another pump suction enhancer used in a third embodiment according to the present invention.
Figure 8:
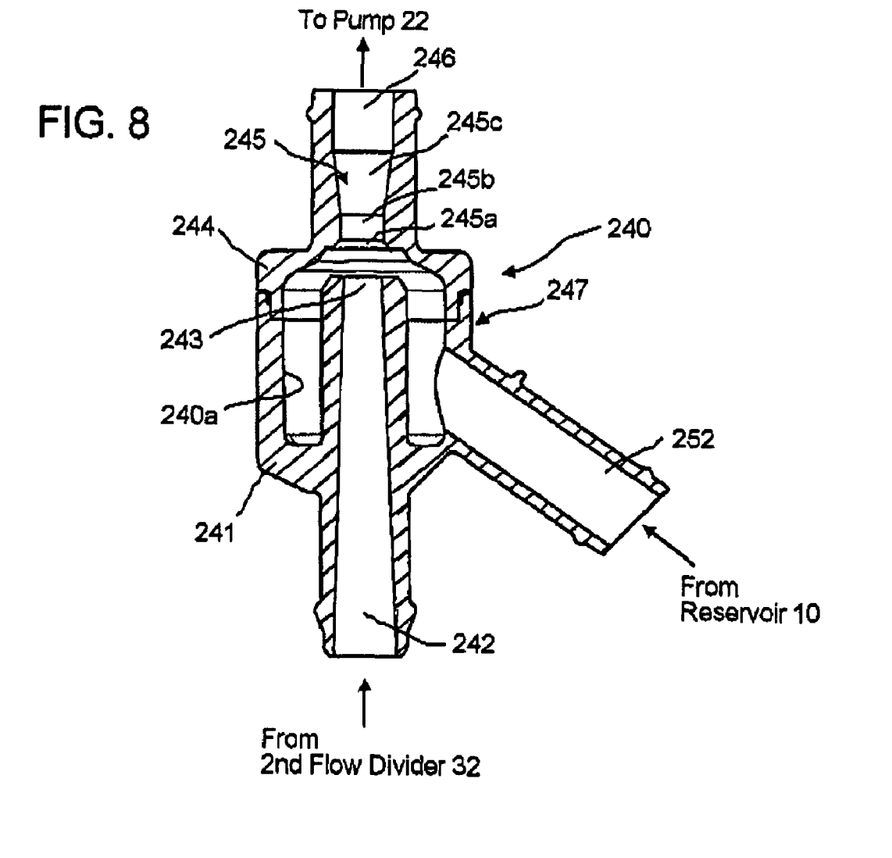
FIG. 8 is a longitudinal sectional view of the pump suction enhancer shown in FIG. 7.

A third embodiment of the present invention will be described hereafter with reference to FIGS. 5, 7 and 8. In the third embodiment, another pump suction enhancer 240 shown in FIGS. 7 and 8 is employed in substitution for the pump suction enhancer 140 which is arranged in the hydraulic system shown in FIG. 5. Like the pump suction enhancer 140 in the second embodiment, the pump suction enhancer 240 in the third embodiment is provided as a discrete component which is separated from the oil pump 22 and the oil reservoir 10. As best shown in FIG. 8, the pump suction enhancer 240 is constituted by joining two parts; i.e., an inlet section 241 and an outlet section 244. The inlet section 241 and the outlet section 244 are joined with each other thereby to constitute a body section 247. The pump suction enhancer 240 defines an annular chamber 240a therein to which a reservoir connection port 252 opens, so that the operating oil is drawn from the reservoir 10 to the annular chamber 240a.

Specifically, the outlet section 244 is seated on, and bodily joined with, a top round edge portion of the inlet section 241 for defining the annular chamber 240a. The inlet section 241 integrally protrudes the inlet port 242 downward and also integrally protrudes a nozzle 243 upward thereby to define the annular chamber 240a around the nozzle 243. That is, the annular chamber 240a is defined at a juncture portion between the inlet section 241 and the outlet section 244 and around a nozzle 243, so that it becomes easier to define the chamber 240a as desired in shape as well as in dimension. The inlet port 242 and the nozzle 243 are connected to constitute a single tapered hole decreasing in diameter toward the nozzle 243. The tapered hole ensures that the return oil flows from the inlet port 242 to the nozzle 243 smoothly not to make any turbulent flow.

The outlet section 244 is spaced at its inner end from the upper end of the nozzle 243 and is formed with a venturi tube passage 245 which includes a chamfer portion 245a, a throat portion 245b, a diffusion portion 245c and an outlet port 246 in turn from the inner end toward the upper end thereof in axial alignment with the nozzle 243. Thus, when the operating oil from the second flow divider 32 (FIG. 5) is ejected as a jet stream from the nozzle 243 into the venturi tube passage 245, the operating oil inside the annular chamber 240a is drawn and plunged into the venturi tube passage 245 by way of the space between the nozzle 243 and the inner end of the venturi tube passage 245. The velocity energy of the jet steam is converted into the pressure energy as the jet stream passes through the venturi tube passage 245, and the pressure of the operating oil charged into the suction port 22b of the oil pump 22 is increased. Consequently, substantially the same effects as in the foregoing second embodiment can be attained in the third embodiment.

Finally, various features and many of the attendant advantages in the foregoing embodiments will be summarized as follows:

In the foregoing first embodiment typically shown in FIGS. 1 and 3 for example, the pump suction enhancer 40 is provided integrally with the oil reservoir 10 which is separated from the oil pump 22 Thus, the pump suction enhancer 40 can be arranged together with the oil reservoir 10 at a desired place which is different from the place where the oil pump 22 is arranged. Thus, the location of the pump suction enhancer 40 in the engine room of the motor vehicle can get rid of being restrained to the location of the oil pump 22 in the engine room, so that freedom can be gained in designing the arrangement of hydraulic components such as the oil pump 22, the oil reservoir 10, the function components 24, 25 and the like in the engine room. Further, since the pump suction enhancer 40 is provided outside, or on an external surface, of the oil reservoir 10, it can be easily assembled with the oil reservoir 10, so that the assembling work for the oil reservoir 10 can be simplified. In addition, the maintenance or check of the pump suction enhancer 40 becomes easier to carry out from the outside of the oil reservoir 10.

Also in the foregoing first embodiment typically shown in FIG. 1, plural flow dividers 31, 32, 34 are used, at least one of which is provided to direct the operating oil discharged from the oil pump 22 exclusively toward the power steering device 24 until the flow of the operating oil toward the power steering device 24 reaches that which the power steering device 24 demands during the operation of its full capability. Thus, the power steering device 24 is given the priority in being supplied with the operating oil from the oil pump 22, so that the power steering device 24 can be operated reliably even while the oil pump 22 is operated at a low rotational speed.

Also in the foregoing first embodiment typically shown in FIG. 1, first to third flow dividers 31, 32, 34 are provided. The first flow divider 31 makes a part of the operating oil pass through the radiator cooling fan device 23. The second flow divider 32 divides the operating oil discharged from the oil pump 22 through the first flow divider 31 into a supply flow toward the third flow divider 34 and a return flow to the pump suction enhancer 40. The third flow divider 34 divides the operating oil directed by the second flow divider 32 into a part and the remaining part thereof, which are used to operate the power steering device 24 and the suspension mechanism 25 respectively before being returned to the oil reservoir 10. Since the second flow divider 32 and the third flow divider 34 first supply the power steering device 24 with the maximum flow volume Q2 demanded thereby, then supplies the suspension mechanism 25 with the maximum flow volume Q3 demanded thereby and finally return the superfluous flow volume to the pump suction enhancer 40. Accordingly, it can be obviated that the power steering device 24 falls into failure due to lack of the operating oil supplied thereto even during the low rotational speed operation of the oil pump 22.

Further, in the foregoing first embodiment typically shown in FIG. 1, since the first flow divider 31 is provided with an electromagnetic control valve 31a, the operating oil flow passing through the radiator cooling fan device 23 is controlled in dependence on the electrical command signal applied to the electromagnetic control valve 31a, so that the operation of the radiator cooling fan device 23 can be controlled in dependence on various conditions during the vehicle traveling.

Further, when the power steering device 24 is kept at either of its operation ends, it may occur that the pressure on a circuit passage line from the second flow divider 32 to the power steering device 24 exceeds a predetermined relief pressure. However, in the foregoing first embodiment typically shown in FIG. 1, since the second flow divider 32 is given a relief function for escaping the operating oil therefrom to the pump suction enhancer 40, the hydraulic system can be prevented from being damaged.

Yet in the foregoing first embodiment typically shown in FIGS. 2 and 3, the pump suction enhancer 40 is provided integrally with the oil reservoir 10 which is separated from the oil pump 10. Thus, the same advantages and effects as attained by the aforementioned hydraulic system can also attained by the oil reservoir 10 in this embodiment.

Yet in the foregoing first embodiment typically shown in FIG. 3, the lid member 12b which closes the lateral opening of the box-like body member 12a of the oil reservoir 10, is provided integrally with the pump suction enhancer 40 so that the side chamber 40a opens to a lower part of the reservoir chamber 14. That is, the pump suction enhancer 40 is provided on an external surface of the oil reservoir 10. Thus, the access to the pump suction enhancer 40 becomes easier, and the inspection thereof can be done easily.

Also in the foregoing first embodiment typically shown in FIG. 3, the operating oil flown into the reservoir chamber 14 from the first return port 10a is deflected by the deflector 17 to be directed toward the side chamber 40a of the pump suction enhancer 40. Thus, the supply of the operating oil to the side chamber 40a can be facilitated, so that plunging the operating oil from the side chamber 40a into the venturi tube passage 45 can be done highly efficiently.

Also in the foregoing first embodiment typically shown in FIG. 1, the nozzle 43 of the pump suction enhancer 40 ejects a larger flow volume than that returned into the reservoir chamber 14. That is, in the pump suction enhancer 40, the larger flow volume ejected as a jet stream from the nozzle 43 draws and plunges the smaller flow volume to be replenished, into the venturi tube passage 45, so that the charge of the operating oil into the suction port 22b of the oil pump 22 can be boosted highly efficiently.

Furthermore, in the foregoing second embodiment shown in FIGS. 5 and 6, the pump suction enhancer 140 is constituted as a discrete component separated from the oil pump 22, the oil reservoir 10 and other function components 23-25 hydraulically operated by the operating oil discharged from the oil pump 22. Therefore, it can be realized to arrange the pump suction enhancer 140 at any desirable place which is suitable for connections with other components 10, 22 and 32, so that the pump suction enhancer 140 does not impose any substantial restraint on the arrangement of the oil pump 22, the oil reservoir 10 and those function components 23-25. In addition, by the appropriate arrangement of the oil pump 22, the oil reservoir 10 and those function components 23-25 in the engine room, the conduits for fluidly connecting the components 10, 22, 32 and others may be made as those having adequate lengths, so that the performance of the hydraulic system can also be improved.

In addition, in the foregoing third embodiment typically shown in FIG. 8, the body section 247 of the pump suction enhancer 240 is constituted by joining two parts including the inlet section 241 formed with the nozzle 243 and the outlet section 244 formed with the venturi tube passage 245. Thus, the number of parts which constitute the pump suction enhancer 240 can be reduced, so that the assembling work for the pump suction enhancer 240 can be simplified, thereby resulting in a substantial reduction in the manufacturing cost.

Also in the foregoing third embodiment typically shown in FIG. 8, since the chamber 240a provided in the body section 247 is defined at a juncture portion between the inlet section 241 and the outlet section 244 and around the nozzle 243, it becomes easier to define the chamber 240a as desired in shape as well as in dimension.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic system for a motor vehicle, comprising:
   an oil pump driven by a prime mover for discharging operating oil from a discharge port thereof;
   at least one functional component hydraulically operated by the operating oil discharged form the oil pump passing therethrough;
   at least one flow divider provided between the oil pump and the at least one functional component for dividing the operating oil discharged from the oil pump into a part thereof directed toward the at least one functional component and the remaining part thereof;
   an oil reservoir provided independently of the oil pump and fluidly connected to the at least one functional component through at least one conduit for receiving the operating oil returned from the at least one functional component; and
   a pump suction enhancer provided bodily with the oil reservoir outside the same for boosting the suction of the operating oil into the oil pump and including:

(a) a body section provided on an external portion of the oil reservoir for defining a side chamber opening to a reservoir chamber defined in the oil reservoir;

(b) a venturi tube passage exposed at an inner end thereof to the side chamber and fluidly connected to a suction port of the oil pump through a second conduit for enabling the operating oil to be drawn into the suction port of the oil pump; and (c) a nozzle fluidly connected to the at least one flow divider for receiving the remaining part of the operating fluid returned from the at least one flow divider and protruding into the side chamber to face the inner end of the venturi tube passage with a space relative to the venturi tube passage for ejecting ajet stream of the operating oil into the venturi tube passage thereby to introduce the operating oil from the side chamber into the venturi tube passage.

2. The hydraulic system as set forth in claim 1, wherein:
the at least one functional component comprises plural function components including a power steering device; and
the at least one flow divider comprises plural flow dividers, at least one of which is arranged to direct the operating oil discharged from the oil pump exclusively toward the power steering device until the flow of the operating oil toward the power steering device reaches that demanded by the power steering device.

3. The hydraulic system as set forth in claim 2, wherein the plural function components includes a radiator cooling fan device, the power steering device and a suspension mechanism, and wherein the plural flow dividers include:
a first flow divider for dividing the operating oil discharged from the oil pump to make a part of the operating fluid flow through the radiator cooling fan device;
a second flow divider for dividing the operating oil, supplied from the first flow divider directly and through the radiator cooling fan device, into a supply flow toward the power steering device and the suspension mechanism and into a return flow to the pump suction enhancer, the second flow divider being operable to make the return flow when the supply flow exceeds the sum of those demanded by the power steering device and the suspension mechanism; and
a third flow divider for dividing the operating oil, supplied from the second flow divider, into a first flow passing through the power steering device and returned to the oil reservoir and into a second flow acting to operate the suspension mechanism and returned to the oil reservoir, the third flow divider being operable to direct the operating oil from the second flow divider exclusively toward the power steering device until the first flow covers that demanded by the power steering device.

4. The hydraulic system as set forth in claim 3, wherein the first flow divider is provided with an electromagnetic control valve which is responsive to an electrical command signal applied thereto for controlling the operating oil flow passing through the radiator cooling fan device, in dependence on the electrical command signal.

5. The hydraulic system as set forth in claim 3, wherein the second flow divider is adapted to relieve pressure by releasing the operating fluid therefrom to the pump suction enhancer when the pressure on a circuit passage line from the second flow divider to the power steering device exceeds a predetermined relief pressure.

6. An oil reservoir incorporated in a hydraulic system for a motor vehicle wherein at least one flow divider is provided for dividing operating oil discharged from an oil pump into a first stream directed toward at least one functional component which is hydraulically operated by permitting the operating oil discharged form the oil pump to pass therethrough, and into a second stream, the oil reservoir comprising:
a reservoir body defining therein a reservoir chamber for containing the operating oil to be supplied to a suction port of the oil pump and provided with a return port for leading the operating oil returned from the at least one functional component to the reservoir chamber; and
a pump suction enhancer provided bodily on the oil reservoir outside the same for boosting the suction of the operating oil into the oil pump and including:
(a) a body section provided on an external portion of the reservoir body for defining a side chamber opening to a reservoir chamber defined in the reservoir body;
(b) a venturi tube passage exposed at an inner end thereof to the side chamber and fluidly connected to the suction port of the oil pump through a conduit for supplying the operating oil to the oil pump; and
(c) a nozzle fluidly connected to the at least one flow divider for receiving the second stream of the operating oil returned from the at least one flow divider and protruding into the side chamber to face the inner end of the venturi tube passage with a space relative to the venturi tube passage for ejecting ajet stream of the operating oil into the venturi tube passage thereby to introduce the operating oil from the side chamber into the venturi tube passage.

7. The oil reservoir as set forth in claim 6, wherein the reservoir body is composed of a generally box-like body member opening at one side and a generally plate-like lid member bodily secured to the body member for closing the one side thereby to define the reservoir chamber in the reservoir body, and wherein the pump suction enhancer is provided integrally with the lid member with the side chamber opening to a lower part of the reservoir chamber.

8. The oil reservoir as set forth in claim 6, wherein the reservoir body is provided with a deflector inside the reservoir chamber for directing the operating oil flown into the reservoir chamber from the return port, toward the side chamber of the pump suction enhancer.

9. The oil reservoir as set forth in claim 6, wherein the at least one flow divider returns a larger flow volume to the nozzle than the flow volume returned into the reservoir chamber directly from the function component means when the oil pump discharges the maximum flow volume thereof.

* * * * *